March 6, 1945.    H. M. WHITTLESEY    2,371,008
BUSINESS INSTRUMENTS AND PREPARATION OF THE SAME
Filed Dec. 26, 1942    3 Sheets-Sheet 1

Inventor:
Harold M. Whittlesey
By Wallace and Cannon
Attorneys.

March 6, 1945.   H. M. WHITTLESEY   2,371,008
BUSINESS INSTRUMENTS AND PREPARATION OF THE SAME
Filed Dec. 26, 1942   3 Sheets-Sheet 2

Inventor:
Harold M. Whittlesey
By Wallace and Cannon
Attorneys.

March 6, 1945.  H. M. WHITTLESEY  2,371,008
BUSINESS INSTRUMENTS AND PREPARATION OF THE SAME
Filed Dec. 26, 1942.  3 Sheets-Sheet 3

Inventor,
Harold M. Whittlesey
By Wallace and Cannon
Attorneys

Patented Mar. 6, 1945

2,371,008

UNITED STATES PATENT OFFICE 2,371,008

BUSINESS INSTRUMENT AND PREPARATION OF THE SAME

Harold M. Whittlesey, Columbus, Ohio

Original application July 21, 1941, Serial No. 403,357. Divided and this application December 26, 1942, Serial No. 470,265

4 Claims. (Cl. 101—2)

This application is a division of my copending application, Serial No. 403,357, filed July 21, 1941.

Business instruments of the present invention may be used as the bills of public utilities or the like, as tax notices of taxing bodies, such as municipal corporations and the like, as premium or other debit notices, such as are distributed by insurance and other companies, and in a wide variety of other instances.

Business instruments of the aforesaid character bear an identification particularizing, that is, characterizing, the instrument, and this identification is usually a name and address and related information. Additionally, such instruments bear variable data such as an amount being invoiced or billed or amounts concerning which notice is being given as by a taxing body or an insurance company. Furthermore, such instruments usually bear other data which, while they vary from instrument to instrument, are nevertheless of a class which reoccurs on a large number of instruments, such data being, for example, the rate schedule under which a customer of a public utility is billed, the tax rate, in instances where the business instruments are tax bills, the premium rate, in the instance of insurance companies, and other data of such a nature that, while they constitute a class group or classification, they are nevertheless related to the particularity of a given business instrument. Furthermore, such business instruments often bear what may well be called special data, such as the indication that an amount billed or noticed by a previous instrument has not been paid or some additional data, such as that a charge for merchandise purchased, in the case of a public utility bill, are to be included on the instrument or special or out of the ordinary data.

Thus, for example, in the case of a public utility bill, the name and address of the customer of the utility are printed on the bill to characterize the same; the consumption of the commodity or commodities distributed by the public utility, the variable data, are also indicated on the bill, as is the rate schedule or schedules under which the customer is billed and other kindred data such as the data which is utilized in analyzing the source of revenue of the public utility, indications as to whether or not a tax is to be paid on the amount billed, for in the case of municipal and eleemosynary corporations and the like it is not necessary for public utility corporations to pay a tax on the amount billed and, of course, there are other classification data of a nature somewhat like that pertaining to the revenue analysis which are included on public utility bills. Furthermore, special data, such as an indication that the account is in arrears, or that a charge is to be made for merchandise, are often included on a public utility bill.

Thus for the purposes of describing this invention, the data which are included on public utility bills, tax bills, insurance notices and kindred business instruments may be said to generally fall into four different groups, the first of which is the identification or characterizing data usually, as stated hereinabove, the name and address, the second of which may be called the variable data which, for example, are amounts being billed or concerning which notice is being given and the like, the third is what may be called classification data, which occur in an identical form on a large number of business instruments, and the fourth is what may well be called special data.

I have observed in the course of preparation of business instruments of the aforesaid character, as this has been effected heretofore, that where a large number of business instruments of the aforesaid character are being prepared by a particular institution or the like, the same variable data, as they have been identified hereinbove, occur on a large number of instruments. Heretofore these data have been entered on the instruments as they are encountered in the course of preparation of the instruments, which is to say, the instruments are usually arranged according to the identifications appearing thereon, either alphabetically or in other grouping, as by being arranged according to street addresses, and in such instances the variable data entered on the instruments are usually unlike from instrument to instrument even though, as I have stated, the same data are entered on a large number of instruments in the course of the preparation of the entire group of such instruments.

The entry of variable data on instruments of the aforesaid character has usually been effected manually; for example, in the case of public utility billing, the operator of what was usually a printing calculating machine would pick up a particular business instrument bearing a particular identification and then, by referring to a source book, usually the book in which the meter readings were entered, would locate the particular items in the book pertaining to the identification on the bill, and thereafter the operator would insert the bill in the machine and then by manual manipulation enter the data from the source or meter reader's book on the bills. This operator also then referred to another source book or the like and ascertained what charge should be made for the consumption quantity and thereafter manually entered such data on the bill. It will be obvious that this was a slow and time-consuming task which has in the past been an appreciable portion of the high cost of preparing business instruments of the character to which this invention pertains.

Thus among the objects of the present invention is to enable the entry of data that have heretofore been entered on business instruments manually to be entered on such instruments by the use of automatically operating high speed machines, and a related object is to enable business instruments which are to receive identical data to be grouped so that the entry of such data thereonto may be expeditiously and economically effected.

In order to enable the aforesaid fundamental object of this invention to be attained, it is necessary that the business instruments be so formed that grouping thereof can be readily effected, and consequently another object of the present invention is to so form business instruments of the aforesaid character that the collecting thereof into groups, which will facilitate the preparation and utilization thereof, may be readily effected.

It will be appreciated that the collecting of business instruments into groups as aforesaid is primarily a sorting problem and while several methods for sorting business instruments are available, I have found it advantageous to so arrange business instruments of the aforesaid character that they may be sorted in accordance with the method disclosed in United States Letters Patent to Perkins No. 1,544,172, patented June 30, 1925, for by arranging business instruments for sorting by this method, visual verification of the results of sorting is facilitated since business instruments that are sorted by this method have slots or notches formed therein that extend to the edges of the instruments. Hence after the instruments have been sorted so as to be collected in what would be groups of instruments bearing, or to bear, corresponding data, the previously formed slots or notches which identify such group should be found to be aligned, and presence or absence of this alignment can be readily ascertained by comparing the slotting or notching in the instruments collected into a particular group. Hence, still another object of this invention is to so notch or slot business instruments that sorting thereof in accordance with the method disclosed in the aforesaid Perkins patent may be expeditiously effected.

In any instance where a plurality of business instruments are prepared and where such instruments are repeatedly handled prior to final distribution thereof, as by mailing of the instruments to persons whose names and addresses appear on the instruments, it is essential that a constant check be kept on the instruments to insure against loss or misplacing of any particular instrument once preparation of the instrument has been begun. I have found that this may be advantageously effected by consecutively numbering or otherwise designating the instruments in the course of preparation thereof so that the instruments may be arranged in accordance with such consecutive numbering or the like at any time which will, of course, reveal if any instrument is missing for a missing instrument will prevent arranging of the instruments in accordance with such consecutive numbering or the like. Thus, another object of the present invention is to so consecutively number or otherwise designate business instruments at an initial stage in the preparation thereof so that the loss or misplacing of a particular instrument may be quickly ascertained at any stage during the preparation of the business instruments or when preparation of the instruments is completed. An object ancillary to the foregoing is to so consecutively number business instruments that arranging thereof in accordance with such consecutive numbering may be expeditiously effected, and a further and related object is to enable the foregoing to be accomplished by producing representations of the number or the like in a system of consecutive numbering or the like in each business instrument so as to enable such representations to be used in sorting the instruments into the consecutively numbered or other relation represented thereon, and an ancillary object is to so produce such representations that sorting may be effected in accordance with the method disclosed in the aforesaid Perkins Patent No. 1,544,172.

In those instances where classification data, as hereinabove defined, are to be included on business instruments, such data are employed for accounting, statistical and like purposes, and thus still another object of my invention is to so include classification data on business instruments that the utilization thereof for accounting, statistical and like purposes may be expeditiously brought about, and an ancillary object is to so represent such classification data on business instruments that the representations may be utilized when accounting, statistical or like data are to be compiled, and a related object is to so afford such representations that in the course of compiling accounting, statistical or like data the instruments may be sorted by the method of the aforesaid Perkins patent.

Inasmuch as the nature of the classification data, as hereinabove defined, that are to appear on a particular business instrument is determined by the identification that is to appear on the particular business instrument, it is yet another object of the present invention to enable the identification and classification data to be produced on a particular business instrument from or under control of a single device bearing such data or representations thereof, a device suitable for the purpose being one of the character disclosed, for example, in Gollwitzer Patent No. 2,049,436, patented August 4, 1936.

Furthermore, since my invention contemplates grouping together of all business instruments of a collection thereof being prepared simultaneously that are to receive identical variable data, a further object of this invention is to produce such variable data on the business instruments by printing such data on the instruments from a previously prepared and carefully checked printing device, and an ancillary object is to print such data from embossed type characters provided on printing devices of the character disclosed in United States Letters Patent to Gollwitzer No. 2,030,865, patented February 18, 1936.

Yet other objects of this invention are to enable what has been called special data hereinabove to be incorporated on business instruments and particularly representations of such data that may be utilized in the sorting of the instruments in accordance with the presence or absence of such representations on the instruments.

In view of the foregoing, it is another object of this invention to produce identification, classification and variable data, as hereinabove defined, or representations of all or a part of such data, on business instruments and to thereafter group together all instruments bearing at least selected corresponding classification and variable data or representations thereof and to thereafter print or represent further variable data, related to or based upon data already appearing or represented on the instruments, and to effect this latter operation successively on all instruments that are to receive corresponding data.

More specific objects than the foregoing are to prepare a device from or under control of which identification and classification data, as hereinabove defined, or representations thereof, may be produced on a business instrument and to thereafter utilize such device to produce such data or representations thereof on a business instrument; to produce representations of selected variable data on the business instrument, and under selected circumstances print variable data, on which the selected represented variable data is based, on the instruments; to group together a plurality of instruments prepared as aforesaid into groups wherein each instrument in the group includes corresponding variable data and selected corresponding classification data; and to prepare for each such group a device form which other variable data, based upon the selected classification and aforesaid variable data of the group to which the device is to pertain, may be printed on an instrument and to thereafter print such other variable data from each such device upon all of the instruments of the group to which such device pertains.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Further and more specific objects of the present invention will be apparent from the following description in which reference is made to the accompanying drawings wherein Fig. 1 is an elevational view showing one face of a partially prepared business instrument of the present invention;

Fig. 2 is an elevational view showing the other face of the business instrument shown in Fig. 1;

Fig. 3 is a view similar to Fig. 2 but showing the business instrument at still another stage in the course of preparation thereof;

Fig. 4 is a view, similar to Figs. 2 and 3, showing a completed business instrument of the present invention;

Figure 5:
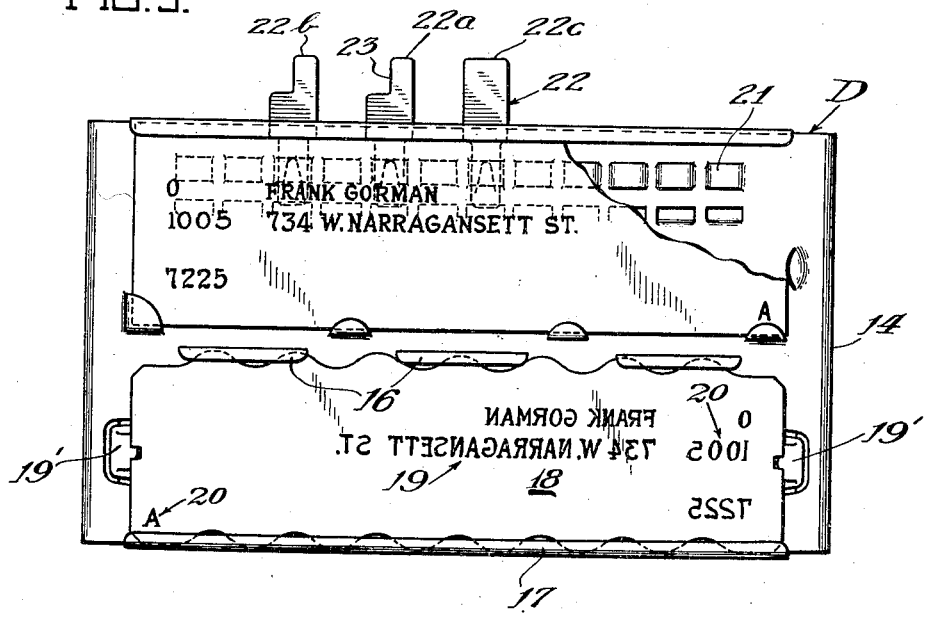
Fig. 5 is an elevational view of a typical printing device that may be employed in the preparation of the business instrument as it appears in Figs. 1 and 2.

It is to be understood that the public utility bill illustrated in the accompanying drawings is but a selected embodiment of my invention for, as has been explained hereinabove, business instruments of this invention may be utilized in a wide variety of ways as, for example, not only by public utility companies but also by taxing bodies, insurance companies and the like.

As can be ascertained by reference to Figs. 1 and 2, the bill, generally indicated by 10, of suitable heavy paper or the like is divided into a plurality of sections and in the present instance the bill includes a main body 10a constituting the accounting stub or portion thereof, a remittance stub 10b and a customer's stub 10c. These sections are defined in the bill 10, in the present instance, by printed lines 11 and 12 which extend transversely across one face of the bill and serve as guides along which the bill may be conveniently divided into its sections. It will be understood, however, that one or both of the printed lines might be supplanted by a score line so as to facilitate division of the bill 10 into its various sections.

In practice, the customer's stub 10c and the remittance stub 10b are mailed to the customer of the utility while the accounting stub 10a is retained by the utility for accounting and like purposes. While the illustrated bill 10 comprises three sections, it will be understood that a business instrument of the present invention might embody a greater or less number of sections, or might consist of but a single section, without departing from the purview of the invention, the number of sections included in the bill being dependent upon characteristics and requirements of the accounting and statistical systems of which the bill is a part.

As can best be ascertained by reference to Figs. 1 and 2, the bill 10 has constantly reoccurring data printed thereon, such as, in the present instance, lines dividing the main body and stubs into areas usually adapted to receive variable data, as defined above, identifications, also a part of the reoccurring data, being printed in association with the areas thus defined for the purpose of identifying the variable or like data printed therein. The reoccurring data, in the present instance, also comprise the name of the utility and the address thereof, instructions with respect to the use of the various sections, the date on or before which payment is due, dates identifying the period to which the bill pertains, a return address and kindred data.

As will be explained in further detail hereinafter, the practice of the present invention entails sorting the bills of this invention into groups and irrespective of the manner in which the bills are to be sorted, it is essential that they all be arranged and faced in a corresponding manner when the sorting is to be done. Thus, as is common in those instances where business instruments are to be sorted, one corner of the instruments is cut away and in the present instance a free corner of the main body or accounting stub 10a is cut away, as indicated at 13, the corresponding corner being cut away on each of the bills of the present invention.

Reference has been made hereinabove to the fact that I have found it advantageous to effect the sorting entailed in the practice of the present invention in the manner disclosed in the above referred to Perkins Patent No. 1,544,172. This method of sorting involves providing perforations along selected margins of the business instruments, or sections thereof, and then by selectively notching the business instruments from determined of such perforations to the adjacent edge thereof, particularity is imparted to each instrument which enables the sorting to be effected. It will be understood, however, that the sorting might be effected in a wide variety of other ways but, as in the present instance where the sorting is to be effected in the manner disclosed in the aforesaid Perkins patent, rows of perforations P are formed along each of the marginal edges of the main body 10a and the free edge of the accounting stub 10c. It is to be understood that other rows of perforations along other marginal edges of sections of the bill might be provided if desired or required.

In the case of public utility bills, which have been selected for the purpose of describing the present invention, each of the bills that are to be sent out at a given time is arranged in the manner thus far described and, if desired, such bills may be printed in a conventional printing machine, the corners may be chamfered by conventional cutting means, and the aforesaid rows of perforations may be produced in the bills in a conventional perforating machine. In event the bills are prepared in this manner a plurality of such blank bills may be arranged in the sheet feeding means of a machine of a character explained hereinafter so that the sheets may be withdrawn and fed to and through the machine one at a time, a sheet feeding means suitable for the purpose being disclosed, for example, in Gollwitzer Patent No. 2,002,773, patented May 28, 1935.

Another way in which blank bills as aforesaid may be prepared is to sever the length of the bills from the width of a web of suitable heavy paper or the like fed to a machine of the character disclosed in Hartley Patent No. 2,041,183, patented May 19, 1936, and, as explained in that patent, the aforesaid reoccurring data and the like that are to be printed on the bills may be printed thereon during passage thereof through such a machine. However, where the sorting of the bills is to be effected in accordance with the disclosure of the above referred to Perkins patent and perforations are to be formed along marginal edges of the bills or sections thereof, it is advantageous to prepare the bills in a machine wherein not only the bills can be cut and printed, as is done in accordance with the disclosure in the aforesaid Hartley patent, but also the necessary perforations may be formed therein as well as the aforesaid corner cutting operation.

Moreover, since each bill is to have particularity imparted thereto by having notches formed therein from selected of the perforations to the adjacent marginal edge of the bill, it is advantageous to prepare the bills in the machine wherein not only are the blank bills, as hereinabove described, prepared, but additional identification data are printed on the bills during passage thereof through the machine and also representations of classification data are produced in the bills by selectively notching the bills from perforations formed therein to adjacent edges thereof.

Where resort is had to a machine of the character just described and printing of the identification data on the respective bills and the selective notching thereof are to be effected, it is necessary that a suitable device, such as may be passed through such a machine, be prepared so as to insure that the identification data printed and the classification data represented on a particular bill will be interrelated. To this end a printing device of the character disclosed in Fig. 5 may be prepared and utilized, but it is to be understood that this device is representative of a wide variety of kindred devices that may be used for the purpose.

In the case of a public utility bill, the classification data that are to appear on a particular bill will be definitely related to the identification, the name and address that appear on the bill. Such classification data in the case of a public utility bill will be, among other things, the rate schedule under which a customer of the utility is to be billed. Rate schedules of a public utility are primarily predicated upon the potential demands of the customer for the commodity being distributed by the utility. Since it is to the advantage of the utility to have the customer use the distributed commodity in an amount closely approaching the potential demands of the customer, resort is usually had to a rate schedule such that a customer pays a particular rate for consumption up to a given quantity of the commodity but as the amount of consumption of the commodity increases the rate at which the customer is charged decreases, resort being had to such rate schedule so as to compensate the company for being equipped to meet the potential demands of the customer and, in a measure, to compensate the customer for utilizing the quantities of the commodity in an amount approaching, equalling or exceeding the potential demands of the customer. Since different customers will have different potential demands, a number of different rate schedules are established and each customer is assigned a proper rate schedule. Each such rate schedule is identified as by having a designation letter or number or both assigned thereto.

Among other classification data that are customarily represented on a public utility bill is that which identifies the nature of a customer, which is to say, these data signify—whether the customer is using the commodity in a residence or for the purpose of lighting a store or for power or heating purposes in a factory or the like or for street lighting, in the case of a municipal corporation, and in a wide variety of other usages of the commodity. These data are customarily included on public utility bills for the purpose of enabling the utility to determine what percentages or quantities of its commodity are being used by various kinds of its customers. In public utility billing, classification data of this nature are frequently referred to as revenue accounts and customarily each such account, as a residence, or lighting for a store or the like has a designation such as an account number assigned thereto. Of course, each customer falls into one or the other of such revenue accounts, and such a designation usually appears on a bill for the customer in the form of the revenue account number or a representation of such a number, this also being true with respect to the rate schedule designation.

Additionally, in the case of public utilities, taxes need be paid on the amounts billed to certain customers but need not be paid in the case of other customers as, for example, municipal and eleemosynary corporations and the like are tax free. Thus other classification data, indicating whether or not a tax is to be paid on an amount billed the particular customer to which the bill pertains, appear on the bill. Furthermore, some utilities desire to ascertain whether or not the bill pertains to consumption of the commodity on a farm and whether or not this is true is indicated by data appearing on the bill. Particularly in the case of public utilities, other classification data or representations thereof appearing on the bill indicate whether or not the bill is what may be called a regular bill or whether it is a final bill, as in the case where a customer moves from a given location and no further bills are to be sent to the customer for consumption of the commodity at the old location. There are many other varieties of classification data that may be included on public utility bills. Furthermore, it will be appreciated that in the case of other business instruments, as for example, tax bills, data or representations thereof pertaining to the tax rate advantageously appear on tax bills, and in the case of insurance companies, data characterizing the notice as to whether it is for a life insurance policy, an accident insurance policy, a fire insurance policy or the like are advantageously represented or otherwise produced on the notice as is, for example, the rate upon which the charge to which a notice pertains is predicated.

In any event, however, the classification data which appear or are represented on business instruments are directly related to the identification which appears on the particular instrument and since such an identification is to be printed on the instrument and since the classification data are either to be printed or represented, or both, on the bill and in view of the definite relation between the classification data and the identification data, a printing device of the character described in Fig. 5 of the accompanying drawings, which may be, for example, a printing device of the character disclosed in Gollwitzer Patent No. 2,049,436, patented August 4, 1936, may be advantageously utilized.

Where resort is had to a printing device of the aforesaid or equivalent character, such device will include means from which the identification, and such classification data as are to be printed, may be printed and also where the classification data are to be represented on the business instruments, the device will include means under control of which such representations may be produced. Thus, as an initial step in the preparation of business instruments of this invention, a printing device, such as that disclosed in Fig. 5, is prepared for each customer or the like that is to receive one of the instruments.

The printing device illustrated in Fig. 5 includes a frame or carrier 14 having lips as 16 and bead as 17 struck up onto the face thereof to receive the longer edges of a substantial rectangular printing plate 18 which, when it is laid onto the face of the frame between the lips 16 and the bead 17, is held against longitudinal movement in such lips and bead by suitably formed depressible retaining devices 19', either of which may be depressed to permit the plate 18 to be slid over and thereby be removed from the lips 16 and the bead 17 and therefore the carrier of frame 14. The plate 18 has type characters as 19 embossed thereon from which the identification which is to be printed on the instruments may be printed, and other type characters as 20 from which classification data and the like may be printed. Thus, for example, in the present instance the letter A is embossed in one corner of the plate 18 to designate the rate schedule, part of the classification data under which the customer is to be charged in the present instance where the printing device D is being prepared for use in the preparation of a utility bill such as that shown in Figs. 1 to 4.

In the present instance representations of classification data are produced in the business instruments by producing representations of numbers in the instruments, the numbers thus selectively represented being respectively indicative of, for example, a particular rate schedule or revenue account or the like. Furthermore, these representations are preferably produced under the code described in Nevin Patent 2,041,085, patented May 19, 1936.

Inasmuch as the classification data that are to be produced or represented on a particular business instrument are directly related to the identification data that are to appear on the instrument and since, as explained above, devices as D may be arranged to include means under control of which representations of classification data may be formed in or on business instruments, the printing devices D are arranged, at the time they are prepared, to include means under control of which representations of such classification data may be produced on the instruments.

Thus, for example, when a particular device D is to be prepared, identification data, printing means as the type 20, are, in the present instance, embossed in the plate 18 which is thereafter mounted on the frame or carrier 14. A frame or carrier as 14 has formed along the longitudinal edge thereof, remote from that on which the bead 17 is formed, a plurality of tab or other particularizing means retaining devices as 21. In the present instance twelve such retaining devices are formed in the frame D to receive the stem portions of the tabs such as are generally indicated by 22. Each tab as 22 includes a head portion which projects beyond the adjacent edge of the device D and, as indicated at 23, such a head portion of a tab may be cut away, the left-hand portion of the tab 22a, Fig. 5, having been cut away to thereby leave the right-hand upper portion of the head of this tab. Of course the right-hand portion could be cut away so as to leave the left-hand portion. Hence, since there are retaining devices as 21 for twelve tabs as 22 and since each tab as 22 may be cut away to afford right or left-hand portions, it will be manifest that twenty-four positions are available in the printing device for the purpose of receiving particularizing means under control of which, in a manner explained presently, representations of classification data may be produced in the business instruments of this invention.

Since at least a portion of the classification data is to be characterized by the use of numbers and since these numbers are to be produced under the code disclosed in the aforesaid Nevin Patent No. 2,041,085, a preferred manner of arrangement for utilizing the available number of particularizing means afforded on a device D is the following.

The code disclosed in the aforesaid Nevin patent utilizes four units for representing the digits in a given order of a particular number. Referring to Fig. 5, the tabs which may be disposed in the two most left-hand retaining devices, which afford four positions, are utilized to receive representations of digits that are to appear in the units order of a particular number under the rate schedule. The next two adjacent retaining devices to the right are utilized to receive representations of digits that may appear in the tens order of such a rate schedule number. The next two adjacent retaining devices 21 afford positions whereat tabs as 22 may be mounted but in so far as this particular set of retaining devices and the tabs that may be mounted therein are concerned, only the most left-hand portion of the most right-hand of such tabs is utilized whereby three instead of four portions are available for representing the digits that may appear in the hundreds order of a rate schedule number, it having been ascertained that such three positions afford accommodation for all the numbers that will be recommodation to identify the various rate schedules. The aforesaid arrangement affords an accommodation for representations of numbers 0 to 699. In the present instance, in accordance with the foregoing system, the tabs 22a and 22b represent a rate schedule of 220 which, under the particular system employed, pertains to the type character A on the plate 18.

Where a printing device as D is being prepared for public utility work, it is convenient to utilize the right-hand portion of the tab whose left-hand portion is utilized in representing digits in the hundreds order of the rate schedule digits as the representation of whether or not the meter of the customer to whom the particular device pertains includes a constant. By the foregoing it is meant that all meters are not direct reading for in many instances the reading of the meter is required to be multiplied by a particular factor in order to ascertain the full consumption quantity, and such factor is, in the nomenclature of the art, a meter constant.

It will be apparent from the foregoing that each of the retaining devices 21 affords two positions whereat particularizing means may be disposed, and it will also be apparent from the foregoing that, as thus far described, twelve of the twenty-four potential positions afforded by the retaining devices 21 on the printing device D are utilized to afford representations of the rate schedule number and also whether or not the meter includes a constant.

Other of the classification data which may be conveniently represented in business instruments, and particularly utility bills such as that illustrated in the accompanying drawings, are representations of still another field of accounting. Thus in public utility billing, and particularly where the commodity is electric current, a revenue account number is assigned to residence use, another to commercial light, another to commercial power, another to industrial power, and so on. Representations of each such number may be conveniently reproduced in a business instrument such as the utility bill illustrated in the accompanying drawings under control of particularizing means located in positions thirteen to nineteen counting from the left-hand end of the printing device D in Fig. 5, and so to do will enable sixty-nine different revenue account numbers to be represented, positions thirteen to fifteen being utilized for representing digits appearing in the tens order of such account numbers and positions sixteen to nineteen being utilized to represent digits appearing in the units order of such numbers, such representations in such an instance of course being made in accordance with the code described in the aforesaid Nevin patent.

Other classification data may be represented by particularizing means appearing in positions twenty, twenty-one and twenty-two from the left-hand end of the printing device D shown in Fig. 5, and among the classification data that may be thus represented are representations indicating whether a bill for a particular customer is, for example, to be sent to the bank of such customer to be paid by the bank, the indication of whether or not the commodity being billed by the bill has been used on a farm, an indication as to whether or not a tax is to be paid on the amount billed, and an indication as to whether or not more than one bill is to be sent to the particular customer as in those instances where a customer demands multiple copies of a particular bill.

The most right-hand or twenty-fourth position available on a printing device D can conveniently be used to indicate whether or not a particular bill is a regular or special bill, a final bill, for example, to a customer being viewed as a special bill.

One manner in which the various positions afforded on the device D can be utilized to afford means under control of which representations of classification data may be produced in a public utility bill have been described hereinabove, but it will be understood that this is only one arrangement to which resort might be had for public utility billing. It will also be understood that if the business instrument was a tax bill, an insurance notice or the like, the available positions at which tabs as 22 may be mounted would be utilized to produce representations of whatever classification data were desired or required. It will be apparent, however, from the foregoing that each device as D includes means from which identification data may be directly printed and also means under control of which representations of classification data may be produced and, if desired, as in the instance of the embossed type characters 20, the device may include means from which the classification data may be printed.

Printing devices prepared as aforesaid are, in accordance with the present invention, sequentially fed through a machine that is operative to print the identification data on the instruments and which is also operative to produce representations of classification data on the instruments in the course of the passage thereof through the machine. For example, in the machine of the character just described, a roll of paper is utilized and a web is withdrawn therefrom and fed to the machine. Preferably the length desired in the business instruments is afforded by the width of the web so that when the web is divided, in the course of operation of the machine, at regularly spaced intervals, business instruments of a desired width and length are cut from the web. In the course of the passage of instruments through a machine of this character, the hereinabove described constantly reoccurring data are printed thereon from a particular printing device. Furthermore, as the instruments pass through this machine, the rows of marginal perforations are produced therein and representations of the classification data, such as explained hereinabove, are produced in the instruments by slotting the instruments from selected of the aforesaid perforations to the adjacent edge of the instrument. Additionally, identification data are printed on the instruments during passage thereof through the machine. The arrangement is such that in so far as a particular instrument is concerned, the printing device D from which the identification is directly printed, causes the proper notching to be effected in such instrument under control of the tabs as 22 included thereon.

It will be seen from the foregoing that once a printing device as D is prepared for a particular customer, that thereafter each time this device is utilized in a machine of the aforesaid character, a business instrument is produced which bears the identification of the customer and such selected classification data as will be printed from type characters included for this purpose on the particular device and also representations of the classification data will be produced, this latter being afforded by the selectively positioned notches formed under control of tabs included on the device.

The bill 10, shown in Figs. 1 and 2, is that which will be prepared from the printing device D shown in Fig. 5 when this bill and this device pass through a machine of the kind just described. In the present instance the tabs 22a and 22b on the printing device D represent a rate schedule number 220 and by referring to Figs. 1 and 2 it will be seen that notches 25 and 26 are formed in the main body 10a of the bill 10, these two notches respectively representing the digit 2 in the hundreds and tens orders, respectively, of a rate schedule number.

Furthermore, the device shown in Fig. 5 has a tab 22c thereon which includes both right and left-hand portions and this tab, in accordance with the code described in the aforesaid Nevin patent, causes two notches 27 and 28 to be formed in the main body 10a of the bill 10 to represent the digit 3 in the tens order of a revenue account number whereby representations of the revenue account number 30 are formed in the bill 10.

Inasmuch as most of the bills which pass through the machine will be regular bills, it is convenient to arrange this machine so that it will form a notch as 29 in every bill unless a tab is disposed at the aforesaid twenty-fourth position on a printing device such as that disclosed in Fig. 5, the appearance of a tab at this position suppressing rather than causing a notching operation which is the function of tabs which appear at other positions. Thus, if the bill 10 were a special bill such as a final bill, no notch 29 would be formed therein but since it is a regular bill, as indicated by the fact that the printing device shown in Fig. 5 does not have a tab at the twenty-fourth position, the notch 29 is formed therein.

Furthermore, in the course of the passage of the bill and the printing device through the aforesaid machine, three impressions are made from embossed type characters on the plate 18. One of such impressions, that indicated by 30, Fig. 1, is a reproduction of all of the type characters provided on the plate 18 and is made on the main body 10a. However, the second of the impressions, 31, which is made on what constitutes the remittance stub 10b of the bill, is merely a reproduction of certain identifying classification data that may be printed from type characters on the plate 18. A printing operation of this character is effected by suppressing the printing operation in so far as the undesired type characters are concerned in one or another of the well understood ways in which they can be accomplished. Such a printing operation is also effected in so far as the impression 32 is concerned. This impression is made on the customer's stub 10c for in this instance only the name and address and the rate schedule designation (A in this instance) are printed for this is all that is required for mailing and like purposes.

It will be understood that while I have shown and described a printing device as D comprising a removable metal plate as 18, a so-called one-piece printing device could be used in place of one including the removable plate as the plate 18. Moreover, perforations or other lacuna could be used on the printing device instead of tabs as 22 and, of course, if desired, stencil printing means could be used in place of embossed type characters. It will therefore be appreciated that the printing device illustrated and described herein is merely one which is typical of a wide variety of devices that could be used within the purview of this invention.

It will be noted that notches 33 and 34 are formed at the free end of the customer's stub 10c and that corresponding notches 33' and 34' are formed in the adjacent end of the main body 10a, it being understood that when the bill 10 is divided along the line 11 the outer ends of the notches 33' and 34' are disclosed. In public utility billing, notches such as the foregoing represent the number of, for example, the meter reader's book (a source of variable information, as will be explained presently) to which the bills being prepared pertain, the identification afforded by these number representations being called the book number. Such a book number is utilized to sort the business instruments into what may well be called a major group, such an operation being effected where bills pertaining to several different meter readers' books are grouped together and need thereafter be segregated into such major groups. In the course of passage of the bills through a machine like that described above, a manually settable notching means is set up and as the bills pass thereby the notches as 33 and 34 and 33' and 34' are produced in accordance with the manual setting of such notching means.

It has been explained hereinabove that it is desirable to insure against loss of one or more business instruments once preparation of a group thereof has been initiated, and to this end the bills are arranged so that they may be collected or sorted into a consecutive arrangement as, for example, by being consecutively numbered, consecutively lettered or the like. In the present instance notches as 35 are formed at the free end of the main body 10a, these notches being formed as the bills pass through the machine described above and are formed by notching means which are set up under control of a consecutively advancing numbering machine or the like so that the bills successively pass through the machine each bill is numbered in accordance with its position in the series. In the present instance the perforations 35, under the code of the aforesaid Nevin patent, represent the number 291, which means that the bill is the two hundred and ninety-first in a series of bills.

It will be appreciated that at any time during the course of preparation of the bills, and when preparation is completed, that by sorting the bills in accordance with the method described in the aforesaid Perkins patent, under control of the perforations 35, the bills may be arranged in consecutive order, which will quickly reveal whether or not any one of the instruments, for example, in a group having the same book number, is missing.

The utility bill that has thus far been described is in some respects like that which may be prepared in a machine such as that disclosed in the aforesaid Hartley Patent No. 2,041,183 except that in addition to bearing the reoccurring data and having the identification data (the name and address and the like that is directly printed from a printing device as a printing device D) the bill 10 has the perforations P formed therein and the notches as 25 described hereinabove. However, the notches as 25, inclusive, are produced in the bill as an incident to the passage of the bills through the machine described hereinabove and the bills are produced in this machine at a speed at least equal to that at which they are produced, for example, in the machine described in the just referred to Hartley patent. It will, therefore, be seen that the bill 10 as thus far described is produced with facility and economy equal to that of bills which do not have notches as 25 formed therein. Hence, in so far as this phase of the preparation of bills as 10 and, of course, other business instruments is concerned, these are produced at least as rapidly and economically as has heretofore been possible in the production of ordinary business instruments, and such bills embody features of utility not possessed by business instruments prepared in accordance with prior practices.

It will be understood that when the printing devices D are arranged for passage through a machine such as that described hereinabove, these devices are arranged in a predetermined order and preferably, in an instance where public utility bills are being prepared, the devices D are arranged in the same order as the names and addresses which are printed therefrom appear in the meter reader's book. Since the printing devices are arranged in this manner, the bills printed therefrom are arranged in a corresponding manner when they pass from the machine in which they are prepared.

Thus, once the bills as 10 have been prepared in the manner illustrated in Figs. 1 and 2, they are arranged in the same order as the names and addresses appear in the meter reader's book which is the source of part of the variable data that is to be included on the bills.

In the present instance part of the variable data that are to appear on the bills, and which is derived from the meter reader's book, are a present meter reading as 36 and a past meter reading as 37. As is well understood, by subtracting a past meter reading from a present meter reading, a consumption quantity is ascertained. Heretofore in the course of preparation of utility bills, a manually operable printing calculating machine has been employed to print past and present meter readings on a utility bill, and such a machine also functions to print the consumption quantity on the bills. However, further manual operations were entailed on each individual bill when public utility bills were prepared according to prior conventional practices, but in accordance with my invention such additional manual and time-consuming operations are avoided for in the present instance it is only necessary for a machine operator to cause the present and past meter readings to be printed on the bill, and concurrently with this operation a representation of the consumption quantity is produced in the bills, and no other time-consuming manual operations are required.

A machine which may be employed for printing the past and present meter readings on the bill 10 and for producing representations of the consumption quantity in this bill may be one somewhat like that disclosed in Sundstrand Patent No. 2,194,270 patented March 19, 1940. It is to be noted, however, that a machine such as that disclosed in this patent is equipped to print items such as the present and past meter readings and the consumption quantity. However, in accordance with the present invention, a machine of the aforesaid character is modified so that the means which would ordinarily function to print the consumption quantity on a bill as 10 will function to produce notches as 38 in the bill and preferably, as in the case of other notches pertaining to numerical quantities, this means functions to produce these notches in accordance with the code described in the hereinabove referred to Nevin patent. Moreover, the notches are formed, as are the other notches hereinabove described, so that the bills as 10 may be sorted in accordance with the method disclosed in the hereinabove referred to Perkins patent.

It is, of course, important that the hereinabove referred to consumption quantity be accurately entered or, in the present instance, represented on the bill. This is assured by effecting what is referred to in the art as a cross-footing operation, the machine disclosed in the aforesaid Sundstrand Patent No. 2,194,270 being operative to effect such an operation.

This is effected in a machine of the aforesaid character by entering in the machine, for example, the present meter reading and thereafter entering the past meter reading. Furthermore, the consumption quantity, which will have been mentally subtracted and been written into the meter reader's book, is also entered into the machine, which is then set in operation to effect a subtracting operation in which the past meter reading is subtracted from the present meter reading. The machine then automatically compares the result of this subtracting operation with the consumption quantity already entered therein and if the two do not correspond, the machine locks up to prevent further operation, for lack of correspondence in these quantities indicates an error. If, however, the quantities do correspond, the machine is not locked up and further operations may be performed. In a machine for use in the present invention, such further operations entail operating the notching means to produce notches as 38 representative of the consumption quantity which, in the present instance where the present meter reading is 1824 and the past meter reading is 1778, is 46, and as the notching operation is effected, the present and past meter readings as aforesaid are printed on the bill.

It has been explained hereinabove that it is frequently necessary to enter certain special data on business instruments of the character to which this invention pertains. For example, in public utility billing, if the consumption quantity is equal to or less than a predetermined amount, known as the minimum quantity, a so-called minimum charge is made, which is not necessarily the consumption quantity times a particular rate but is rather a flat charge. Other examples of special data are an indication that a charge is to be made for merchandise that has been purchased by the customer or an indication that a bill is substantially greater than or less than that which is usually rendered the customer, a circumstance such as this necessitating an investigation to determine whether or not an error has been made. Furthermore, in some instances, the meter reader does not gain access to the meter and it is customary for utilities in instances such as this to estimate a bill for the current month and when this is done, data indicative of this are included on the bill. Additionally, if a customer has not paid a previous bill or, in other words, if the account is in arrears, this fact is also noticed on the bill.

In the present instance special data such as the foregoing, which it will be understood are exemplary of a wide variety of special data of this general character, may be entered or noticed on the bills as 10 by forming notches in association with selected of the perforations as 39 which, as can be ascertained by reference to Fig. 2, are associated with the word "Special" on the bills as 10. Each such perforation is devoted to a different item of the special data so that a notch formed in association with any such perforation will be representative of such data.

A machine of the character disclosed in the aforesaid Sundstrand Patent No. 2,194,270 is usually equipped with keys under control of which accounting data may be printed and where bills are being prepared by the use of such machine in accordance with the present invention, such keys are equipped to selectively operate suitable notching means, rather than the printing means which have been operated by such keys heretofore.

For the purpose of the present invention which, as will be explained hereinafter, there may be instances where the consumption quantity exceeds a predetermined quantity and where this is found to be true, such bills are preferably removed from the group so that the additional data that are to be entered in such unusual circumstances may be entered manually. This, however, will be a minor portion of the bills that are being prepared, and furthermore may be ascertained in the course of one of the sorting operations that are effected in accordance with the present invention, as will be explained hereinafter.

Moreover, it has been explained hereinabove that in certain instances the meter includes what is referred to as a meter constant and in such instances, as has been explained, the subtraction of a past meter reading from a present meter reading does not represent the true consumption quantity but rather the remainder in such a subtraction needs to be multiplied by the factor or constant. It has been explained hereinabove that where the meter includes a constant, the printing device shown in Fig. 5 is equipped with a tab which will cause a notch to be made at the perforation 40. Furthermore, this fact will appear on the meter reader's book so that the likelihood of a consumption quantity, which should be multiplied by a factor, (as where the meter includes a constant) being improperly entered, is substantially mitigated. Moreover, as will be explained presently, by reason of the presence of a notch at the perforation 40, those bills which pertain to customers whose meters include a meter constant may be sorted from the remainder of the bills, which affords a positive check to assure that all consumption quantities which should be multiplied by a factor will have this operation performed with respect thereto.

As in the case of preparing the bills to the extent illustrated in Figs. 1 and 2 which, as explained hereinabove, may be prepared with facility equal to that heretofore attained in the preparation of ordinary bills, preparation of the bill to the stage illustrated in Fig. 3, where the notches 38 have been produced in the bill, may likewise be performed with facility and economy equal to and, in fact, greater than that heretofore realized in the preparation of utility bills. The reason for this latter is that heretofore other variable data, predicated upon the consumption quantity, have usually been entered on the utility bills at the time the consumption quantity was entered thereon and inasmuch as this entailed manually controlled calculating operations for each individual bill, an undue time consumption ensued in the preparation of the utility bills. This was particularly true since, as explained hereinabove, consumption quantities are charged for under rate schedules, and the rate schedule usually varies from customer to customer. Hence, even after a consumption quantity was ascertained, it has heretofore been necessary to determine the rate schedule under which a charge should be made for the consumption quantity and once the rate schedule was ascertained, calculating operations were thereafter performed to determine the charge.

In the present instance, however, representations of the rate schedule are automatically produced in the bills as an incident to the preparation thereof to the extent shown in Figs. 1 and 2. Furthermore, the consumption quantity is entered on the bill when it is prepared to the extent illustrated in Fig. 3 and, as just explained, this is done much more expeditiously than it has heretofore been possible to prepare bills to this extent.

However, when the bills have been prepared to the extent illustrated in Fig. 3, a striking benefit of my invention is realized, for in place of performing a calculating operation for each bill to effect entry of the amount to be charged for the particular consumption quantity, it is only necessary to effect sorting and printing operations, both of which may be performed economically and rapidly, and thereafter the charge for the consumption quantity and the consumption quantity itself, in accordance with the present arrangement, are printed on the business instruments.

It will be appreciated that when a large number of public utility bills are being prepared concurrently, a great many of the bills will include the same rate schedule. Furthermore, it has been ascertained that a great many bills having the same rate schedule will have the same consumption quantity entered thereon. Hence, after the bills have been prepared to the extent illustrated in Fig. 3, in the manner hereinabove described, two sorting operations are effected, in the present instance, in accordance with the method disclosed in the hereinabove referred to Perkins patent. In the first of these sorting operations, all those bills bearing a like rate schedule designation are sorted into a group, all bills in each such group bearing the same rate schedule designation. The result of this sorting operation will be the grouping together of a relatively large number of public utility bills.

Once this sorting operation has been effected, each group is subjected to a further sorting operation to bring all of the bills in the group bearing representations of the same consumption quantity into a group, it being understood that each bill in each such group will bear representations of the same consumption quantity. It will, therefore, be appreciated that when these two sorting operations are completed, all bills for which a charge is to be made at the same rate schedule will be grouped in what may be termed a major group and all bills within this major group having a like consumption quantity for which a charge is to be made at the particular rate schedule will be grouped in what may be termed a minor or sub-group. In grouping the bills in accordance with the second of the aforesaid two sorts, the bills are brought into a consecutive arrangement, which is to say, all bills having the lowest consumption quantity, for example 2, are arranged first in such consecutive arrangement and thereafter those having the next highest consumption quantity, the highest consumption quantity that is to be handled in accordance with the present invention.

Figure 6:
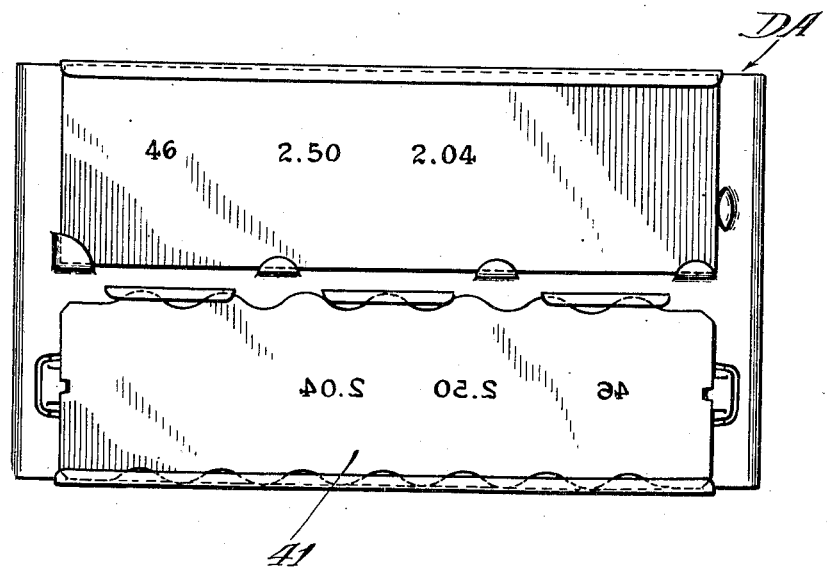
Fig. 6 is an elevational view of a typical printing device from which variable data may be printed on business instruments.

As a further step in carrying out the present invention, a plurality of printing devices, such as that illustrated in Fig. 6, are prepared. This printing device, which is indicated by DA, structurally corresponds to the printing device D and includes a removable embossed printing plate 41. Type characters are embossed in each plate as 41 so that a consumption quantity, a gross charge therefor, and a net charge therefor, under a particular rate schedule, may be directly printed therefrom into the areas as 42, 43 and 44 defined on the bills as 10 to receive such amounts, such areas being provided on each of the three sections of the bills as 10 in the present instance. It will also be understood that, as is common in public utility practice, the net bill represents a predetermined discount from the gross bill which is allowed if the bill is paid on or before a certain date, which date is usually indicated on the bill as is done at 45 in the present instance, this being part of the reoccurring data hereinabove referred to. It will be appreciated that in order for the items to be printed from embossed type characters on the plate 41 in the areas 42, 43 and 44, the type characters from which impressions are to be made in these areas are spaced on the plate 41 corresponding to the spacing of the areas on the bill 10.

It will be appreciated that a plurality of printing devices as DA are prepared and once prepared these are repeatedly used. Hence, when a group of bills that are being concurrently prepared have been sorted into groups by reason of the two sorts hereinabove described, these bills are then ready to receive impressions from printing devices as DA. To this end printing devices as DA are introduced into a printing machine and special sheets are interposed between each goup of bills 10 that have representations of a corresponding consumption quantity thereon and the so arranged and separated bills are then introduced into the sheet feeding portion of the just referred to printing machine. The printing devices DA are arranged to pass through the machine in the same order as that in which the grouped bills 10 are to pass through the machine, which is to say, the printing device DA pertaining to a consumption quantity of, for example 2 is the first to pass through the machine, and thereafter one pertaining to the consumption quantity of 4, and then that pertaining to 6 and so on passes through the machine.

The bills that are to receive impressions from the printing devices DA are arranged in the sheet receiving rack in the machine in which these printing devices are placed. The lowest bills in the consecutive arrangement thereof are arranged in position to be first withdrawn from the rack. Furthermore, the lowest printing device DA in the consecutive arrangement of such devices is advanced to printing position in the machine where it remains until all of the bills that are to receive impressions therefrom, which is to say, all of the bills that bear a representation of a consumption quantity and a rate schedule, such as that to which the particular printing device pertains, have passed through the machine. The machine through which the group of bills and the printing devices DA are passed is preferably so arranged that as soon as the bills in one minor group receive impressions from the printing device from which they are to receive impressions, a new printing device is automatically advanced into printing position and, as an incident to this, operation of the machine is interrupted.

It will be noted that areas as 42, 43 and 44 are included on each of the three sections of the bill 10 and thus the machine through which the bills 10 and the printing devices as DA are passed is arranged to make three impressions on each bill passed therethrough and in order that this may be effected, certain parts in the machine operate to complete one cycle of operation for each bill that passes through the machine. Hence, since operation of the machine is interrupted each time a new printing device advances into printing position and since certain parts in the machine perform a single cycle of operation for each bill that passes through the machine, a counting operation can be effected and in the present instance this counting operation is utilized to accumulate the amounts printed from the printing devices DA.

Hence, prior to the time the first group of bills is passed through the machine, keys operative to enter into a selected accumulator in a conventional adding machine, are locked up to be operative so that the three amounts which may be printed from the first of the printing devices DA to pass through the machine may be entered into selected accumulators. Then as the bills or sheets 10 pass through the machine, the parts operative in timed relation with the passage of the sheets through the machine render operative means associated therewith which, in turn, render the adding machine operative whereby, for each sheet that passes through the printing machine, an entry is made into the accumulators of the adding machine. Then when operation of the machine is interrupted as an incident to the passage of a new printing device into printing position in the printing machine, the setting of the adding machne is manually changed to correspond to the data appearing on the second of the printing devices and, as the sheets in the second group thereof pass through the machine, these data are entered in the accumulators. Hence, at the end of a run of an entire collection of bills, the accumulators in the adding machine display the total amounts of the items that have been printed in the areas as 42, 43 and 44 on the bills. It will be understood, of course, that a reading can be taken from the accumulators of the adding machine each time operation of the printing machine is interrupted and that then the accumulators can be cleared. If resort is had to this, the various totals that have been taken off are thereafter added up to ascertain the amounts that have been printed as an incident to the passage of the bills through the printing machine through which the printing devices DA are passed. This, therefore, affords a record of the total amount billed.

As can be ascertained by reference to Fig. 4, wherein the bill shown is representative of a bill that has passed through the machine through which the printing devices DA are passed, preparation of the bill is completed. In order to ascertain that all bills are present so as to prevent loss, the bills are preferably sorted back into the consecutive numbering arrangement by the use of the notches 35 and if it is ascertained that all of the bills are available, the bills may be divided along the line 11 and the sections 10b and 10c may be mailed to the customers and the main body or accounting stub 10a may be retained.

It will be appreciated that once the calculations entailed in preparing the printing devices DA have been performed, it is not necessary to repeat these calculations and consequently the entry of the variable data that appear in the areas 42, 43 and 44 is merely a printing operation, devoid, in so far as the particular entry is concerned, of any calculating machine operations. Being a printing operation, the entry of these data may be effected very rapidly and it is this, among other features above described, that materially expedites the preparation of business instruments in accordance with my invention. It will be understood, of course, that if tax bills, insurance notices or the like were being prepared, then the printing devices DA would bear type characters from which data ordinarily entailing calculating operations for such bills or notices could be printed.

It has been explained hereinabove that notches are selectively formed in association with the perforations 39 in instances where, for example, other data are to be entered on the bill. Thus, if there is to be a charge for merchandise or if there are errors or other similar circumstances, prior to the time the bills are separated along the line 11, those bills bearing notches selectively located in association with the perforations 39 are sorted from the other bills and in any desired manner other such data, that are to be entered on the bills, are entered thereon.

The accounting stub 10a which is retained by the utility may be used in a wide variety of ways among which is the separation of such stubs in accordance with the revenue number that appears thereon which, as explained hereinabove, enables the utility to determine the consumption by each of various classes of customers. Furthermore, the presence or absence of a notch at the perforation 42, which is produced under control of a tab at the twenty-third tab position on the printing device D, as explained hereinabove, indicates that a bill bearing such a notch is tax free. Thus a sorting may be performed in connection with the method disclosed in the above referred to Perkins patent, and all stubs bearing a notch at perforation 42 are eliminated and thereafter the amount of tax that is to be paid on the remaining bills of the utility may be ascertained.

It will be appreciated that the accounting stub 10a can be used for a wide variety of other purposes, depending upon the data that is represented therein by selectively located notches formed in association with selected of the perforations P, the foregoing being exemplary of such usages.

Hereinabove I have referred to affording representations of numerical values in accordance with the code described in Nevin Patent No. 2,041,085, but it will be understood that in so far as the present invention is concerned this is optional, for numerical values, if desired, could be directly represented or they could be represented in accordance with any other suitable code.

Moreover, I have described the sorting as being effected in the manner described in Perkins Patent No. 1,544,172, but it will be understood that sorting could be effected in a wide variety of other ways which might entail forming perforations at selected positions within the body of the instrument, and perforations at such selected positions would serve to enable the sorting to be brought about. Such arrangement of openings for the purpose of sorting and the like is well understood in the art as is the method of sorting described in the Perkins patent, and in so far as the present invention is concerned the thing of primary importance in so far as sorting is concerned is that it be possible to sort the instruments in the course of preparation thereof at the times and in the manner described hereinabove.

It will be manifest from the foregoing description that I have provided a novel utility bill as well as a novel method by which such bills may be expeditiously and economically prepared and thus, while I have illustrated and described a selected embodiment of my invention, it is to be understood that this is capable of variation and modification and I therefore do not wish to be limited to the precise details set forth but desire to avail myself of such changes and alterations as fall within the purview of the following claims:

I claim:

1. The method of preparing business instruments which consists in forming predetermined sorting control indicia on each instrument, forming other and varying sorting control indicia on each instrument, sorting the instruments under control of the predetermined sorting control indicia thereon to group together all instruments having like predetermined sorting control indicia, sorting the instruments so grouped under control of the varying control indicia thereon to group together all instruments bearing like predetermined and varying sorting control indicia, and then printing like data on all the instruments in each group of instruments bearing like predetermined and varying sorting control indicia.

2. The method of preparing business instruments which consists in printing identification data on each instrument, forming predetermined sorting control indicia on each instrument, forming other and varying sorting control indicia on each instrument, sorting the instruments under control of the predetermined sorting control indicia thereon to group together all instruments having like predetermined sorting control indicia, sorting the instruments so grouped under control of the varying sorting control indicia thereon to group together all instruments having like predetermined and varying sorting control indicia, and then printing data related to the predetermined and varying sorting control indicia on all the instruments in each group of instruments having like predetermined and varying sorting control indicia thereon.

3. The method of preparing business instruments which consists in preparing a device from which an identification may be printed on an instrument and under control of which predetermined sorting control indicia may be formed on each instrument, utilizing each such device to print an identification on an instrument and to form predetermined sorting control indicia on the instrument, forming other and varying sorting control indicia on each instrument, sorting the instruments under control of the predetermined sorting control indicia thereon to group together all instruments having like predetermined sorting control indicia, sorting the instruments so grouped under control of the varying control indicia thereon to group together all instruments bearing like predetermined and varying sorting control indicia, and then printing like data on all instruments in each group of instruments bearing like predetermined and varying sorting control indicia.

4. The method of preparing business instruments which consists in preparing a device from which an identification may be printed on an instrument and under control of which predetermined sorting control indicia may be formed on each instrument, utilizing each such device to print an identification on an instrument and to form predetermined sorting control indicia on the instrument, forming other and varying sorting control indicia on each instrument, sorting the instruments under control of the predetermined sorting control indicia thereon to group together all instruments having like predetermined sorting control indicia, sorting the instruments so grouped under control of the varying control indicia thereon to group together all instruments bearing like predetermined and varying sorting control indicia, preparing a device from which data based upon selected predetermined and varying sorting control indicia may be printed, and utilizing such a device to print like data on all the instruments in each group of instruments bearing like predetermined and varying sorting control indicia.

HAROLD M. WHITTLESEY.